(12) United States Patent
Wang et al.

(10) Patent No.: US 11,799,419 B2
(45) Date of Patent: Oct. 24, 2023

(54) DETECTION CONDITION DETERMINING METHOD, APPARATUS, AND PHOTOVOLTAIC SYSTEM (71) Applicant: Huawei Digital Power Technologies Co., Ltd., Shenzhen (CN)

(72) Inventors: Jianqiang Wang, Shanghai (CN); Song Wan, Shanghai (CN); Yanzhong Zhang, Shanghai (CN); Yongbing Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/533,614

(22) Filed: Nov. 23, 2021

(65) Prior Publication Data

US 2022/0085758 A1 Mar. 17, 2022

Related U.S. Application Data (63) Continuation of application No. PCT/CN2020/092171, filed on May 25, 2020.

(30) Foreign Application Priority Data

May 28, 2019 (CN) .......................... 201910452494.X (51) Int. Cl.
*H02S 50/00* (2014.01)
*H02S 40/32* (2014.01)

(52) U.S. Cl.
CPC .............. *H02S 50/00* (2013.01); *H02S 40/32* (2014.12)

(58) Field of Classification Search
CPC .... G01R 31/00; G05B 15/02; G05B 19/0428; Y04S 10/123; Y04S 10/30; Y04S 10/12;
(Continued)

(56) References Cited

U.S. PATENT DOCUMENTS 6,037,758 A * 3/2000 Perez ........................ H02J 7/35
307/64
8,159,238 B1 * 4/2012 Krasowski .............. H02S 50/10
136/290
(Continued)

FOREIGN PATENT DOCUMENTS

CN 101577407 A * 11/2009 ............... H02G 7/16
CN 103457288 A 12/2013
(Continued)

OTHER PUBLICATIONS

International Search Report issued in corresponding International Application No. PCT/CN2020/092171, dated Aug. 5, 2020, pp. 1-5.
(Continued)

*Primary Examiner* — Tung S Lau
(74) *Attorney, Agent, or Firm* — HAUPTMAN HAM, LLP (57) ABSTRACT

In a detection condition determining method, a control center obtains a working parameter value of a target photovoltaic device in a first time length closest to a current time point, where the working parameter value of the target photovoltaic device may be provided for the control center by a photovoltaic inverter coupled to the target photovoltaic device. The control center detects the target photovoltaic device in response to the control center determining, based on the working parameter value, that an environmental parameter value of the target photovoltaic device meets an environmental parameter threshold. Using the method helps reduce operation and maintenance costs of a photovoltaic power station.

15 Claims, 6 Drawing Sheets

(58) Field of Classification Search
CPC .......... H02S 50/10; H02S 40/32; H02S 50/00; H02S 40/30; Y02E 10/50; H02J 2300/24; H02J 3/383
See application file for complete search history.

(56) References Cited

U.S. PATENT DOCUMENTS

| | | | | |
|---|---|---|---|---|
| 11,476,801 | B2* | 10/2022 | Hoff | G06Q 10/04 |
| 2013/0311121 | A1* | 11/2013 | Kohno | G01R 31/40 |
| | | | | 702/64 |
| 2015/0090311 | A1 | 4/2015 | Mau et al. | |
| 2018/0131322 | A1* | 5/2018 | Deceglie | H02S 40/30 |

FOREIGN PATENT DOCUMENTS

| | | | | | |
|---|---|---|---|---|---|
| CN | 204906318 | U | | 12/2015 | |
| CN | 105281582 | A | * | 1/2016 | ............ Y02E 10/56 |
| CN | 105680797 | A | | 6/2016 | |
| CN | 105743439 | A | | 7/2016 | |
| CN | 103701410 | B | | 9/2016 | |
| CN | 106021806 | A | | 10/2016 | |
| CN | 106230378 | A | | 12/2016 | |
| CN | 107204741 | A | | 9/2017 | |
| CN | 107508551 | A | | 12/2017 | |
| CN | 107634719 | A | | 1/2018 | |
| CN | 206948263 | U | | 1/2018 | |
| CN | 108055002 | A | | 5/2018 | |
| CN | 108092622 | A | | 5/2018 | |
| CN | 108649897 | A | | 10/2018 | |
| CN | 108809256 | A | * | 11/2018 | ............ H02S 50/00 |
| CN | 109638878 | A | | 4/2019 | |
| CN | 109905084 | A | * | 6/2019 | ............ H02S 40/32 |
| CN | 110297136 | A | | 10/2019 | |
| DE | 102015122636 | A1 | * | 6/2017 | ........... G01R 27/025 |
| EP | 3780386 | A1 | * | 2/2021 | ............ H02S 40/32 |
| JP | 2015114739 | A | | 6/2015 | |
| JP | 2018133955 | A | | 8/2018 | |
| KR | 101458363 | B1 | | 11/2014 | |
| KR | 101739740 | B1 | * | 5/2017 | |
| KR | 20170056763 | A | * | 5/2017 | |

OTHER PUBLICATIONS

Chinese Office Action issued in corresponding Chinese Application No. 201910452494.X, dated Feb. 22, 2021, pp. 1-8.
Extended European Search Report issued in corresponding European Application No. 20814748.8, dated Jan. 12, 2022, pp. 1-5, European Patent Office, Munich, Germany.

* cited by examiner

DETECTION CONDITION DETERMINING METHOD, APPARATUS, AND PHOTOVOLTAIC SYSTEM

CROSS-REFERENCE TO RELATED APPLICATIONS

This application is a continuation of International Application No. PCT/CN2020/092171, filed on May 25, 2020, which claims priority to Chinese Patent Application No. 201910452494.X, filed on May 28, 2019. The disclosures of the aforementioned applications are hereby incorporated by reference in their entireties.

TECHNICAL FIELD

This application relates to the field of photovoltaic power generation technologies, and in particular, to a detection condition determining method, an apparatus, and a photovoltaic system.

BACKGROUND

Solar photovoltaic power generation technologies are a type of low-carbon, environment friendly, and green energy technology, and are being more widely used currently. Generally, the solar photovoltaic power generation technologies may be implemented by a photovoltaic power station. The photovoltaic power station mainly includes a photovoltaic panel and a photovoltaic inverter, and the photovoltaic panel can receive solar irradiation and convert received luminous energy into electric energy in a form of a direct current. The photovoltaic inverter can receive the electric energy in the form of a direct current from the photovoltaic panel, convert the electric energy in the form of a direct current into electric energy in a form of an alternating current, and then input the electric energy in the form of an alternating current into an alternating current power grid.

To ensure stability of photovoltaic power generation, the photovoltaic power station usually needs to be detected. However, most detection technologies are limited by an environment in which the photovoltaic power station is located, and accuracy of a detection result can be ensured only by performing detection under a specific environmental condition.

Currently, an environmental monitoring apparatus is usually disposed near the photovoltaic power station to monitor a current environmental status of the photovoltaic power station. The environmental monitoring apparatus can report an environmental parameter value obtained through monitoring to a control center, and the control center determines the current environmental status of the photovoltaic power station based on the environmental parameter value reported by the environmental monitoring apparatus. When the current environmental status of the photovoltaic power station meets a detection condition, the control center triggers detection of the photovoltaic power station. However, deployment of the environmental monitoring apparatus increases operation and maintenance costs of the photovoltaic power station. Therefore, the detection of the photovoltaic power station needs further research.

SUMMARY

Embodiments of this application provide a detection condition determining method, an apparatus, and a photovoltaic system, to reduce operation and maintenance costs of a photovoltaic power station.

According to a first aspect, at least one embodiment of this application provides a detection condition determining method, including: A control center obtains a working parameter value of a target photovoltaic unit in a first time length closest to a current time point. In this at least one embodiment of this application, the working parameter value of the target photovoltaic unit may be provided for the control center by a photovoltaic inverter coupled to the target photovoltaic unit. The control center detects the target photovoltaic unit if the control center determines, based on the working parameter value, that an environmental parameter value of the target photovoltaic unit meets an environmental parameter threshold.

The photovoltaic inverter is a common device in a photovoltaic power station, and may convert electric energy that is in a form of a direct current and that is generated by a photovoltaic unit into electric energy in a form of an alternating current, so that the electric energy generated by the photovoltaic unit may be incorporated into a three-phase power grid. In addition, the photovoltaic inverter may further report a working parameter value of the photovoltaic unit to the control center, so that the control center may determine a working status of the photovoltaic unit based on the working parameter value, for example, may determine a power generation capacity and generating power of the photovoltaic unit. In this at least one embodiment of this application, whether the target photovoltaic unit may be detected is determined by using the working parameter value provided by the photovoltaic inverter, there is no need to dispose a dedicated environmental monitoring apparatus near the photovoltaic power station, and there is no need to change an existing device in the photovoltaic power station. Therefore, this helps reduce operation and maintenance costs of the photovoltaic power station.

In a possible implementation, an environmental parameter threshold is preset in the control center. The control center may obtain, through calculation based on a working parameter value, an environmental parameter value corresponding to the working parameter value; and detect the target photovoltaic unit if the control center determines that the environmental parameter value meets the preset environmental parameter threshold.

For example, the working parameter value may be a working current value of the target photovoltaic unit, and the environmental parameter value may be an irradiance value of the target photovoltaic unit. In this case, the working parameter value and the environmental parameter value may meet the following formula:

$$G_{irr} = \frac{I_{test}}{\beta * I_{STC}} * 1000$$

$G_{irr}$ is the irradiance value, $I_{test}$ is the working current value, $\beta$ is a preset coefficient, and $I_{STC}$ is a short-circuit current value of a component nameplate of the target photovoltaic unit.

In another possible implementation, a working parameter threshold is preset in the control center. The working parameter threshold may be a working parameter value of the target photovoltaic unit determined when an environmental parameter value of an environment in which the target photovoltaic unit is located is the environmental parameter threshold. In this case, if the control center determines that the working parameter value meets the preset working parameter threshold, the control center may also detect the target photovoltaic unit.

In a possible implementation, the method further includes: The control center starts cyclic detection if the control center determines, based on the working parameter value, that the environmental parameter value of the target photovoltaic unit does not meet a corresponding environmental parameter threshold. The cyclic detection includes: obtaining again, at an interval of a second time length, a working parameter value of the target photovoltaic unit in a first time length closest to a current time point, and determining, based on the working parameter value, whether to detect the target photovoltaic unit.

By using the foregoing method, the target photovoltaic unit may be continuously monitored even if a current environmental status is not suitable for detecting the target photovoltaic unit, and the target photovoltaic unit may be automatically detected when an environmental status is suitable for detecting the target photovoltaic unit. This helps reduce a workload of operation and maintenance personnel, thereby further reducing the operation and maintenance costs of the photovoltaic power station.

For example, whether to start cyclic detection may be triggered by a user instruction. If the control center receives a first user instruction used to instruct the control center to start the cyclic detection, the control center starts the cyclic detection. In addition, if the control center receives a second user instruction that instructs to perform detection, the control center detects the target photovoltaic unit even if the environmental parameter value does not meet the corresponding environmental parameter threshold.

In a possible implementation, after the cyclic detection is started, the control center may further monitor duration of the cyclic detection; obtain a detection result of each time of detection after the duration reaches a preset third time length, or after a quantity of detection times for detecting the target photovoltaic unit after the cyclic detection is started reaches a preset quantity threshold; and may further output a detection report based on the quantity of detection times and the detection result of each time of detection.

By using the foregoing method, the control center outputs the detection report, so that the operation and maintenance personnel analyze a working status of the target photovoltaic unit in a specific time length, thereby helping improve an operation and maintenance effect of the photovoltaic power station.

For example, in this at least one embodiment of this application, the target photovoltaic unit may be a photovoltaic module or a photovoltaic string set, and the photovoltaic string set is a set of at least one photovoltaic string. The working parameter value in this at least one embodiment of this application may be at least one of a working current value, a working voltage value, a working power value, a maximum power point tracking (MPPT) current value, an MPPT voltage value, or an MPPT power value of the target photovoltaic unit. The environmental parameter value in this at least one embodiment of this application may be at least one of a temperature value, an irradiance value, and a wind speed value of the environment in which the target photovoltaic unit is located.

According to a second aspect, at least one embodiment of this application provides an apparatus. The apparatus may be a control center, or may be a semiconductor chip disposed in the control center. The apparatus has a function of implementing the first aspect and various possible implementations of the first aspect. The function may be implemented by hardware, or may be implemented by hardware executing corresponding software. The hardware or the software includes one or more units or modules corresponding to the foregoing function.

According to a third aspect, at least one embodiment of this application provides an apparatus. The apparatus includes a processor and a memory. The memory is configured to store program instructions that can be executed by a computer. When the apparatus runs, the processor executes the program instructions stored in the memory, so that the apparatus performs the method provided in any one of the first aspect or the implementations of the first aspect.

According to a fourth aspect, at least one embodiment of this application further provides a photovoltaic system. The photovoltaic system includes a target photovoltaic unit, a control center, and a photovoltaic inverter. The target photovoltaic unit is configured to absorb irradiation energy and convert the irradiation energy into electric energy. The photovoltaic inverter is configured to be coupled to the target photovoltaic unit, detect a working parameter value of the target photovoltaic unit, and provide the working parameter value of the target photovoltaic unit for the control center. The control center is configured to perform, based on the working parameter value provided by the photovoltaic inverter, the method provided in any one of the first aspect or the implementations of the first aspect.

According to a fifth aspect, at least one embodiment of this application further provides a non-transitory computer-readable storage medium. The non-transitory computer-readable storage medium stores program instructions. When the program instructions are run on a computer, the computer may be enabled to perform the method provided in any one of the first aspect or the implementations of the first aspect.

According to a sixth aspect, at least one embodiment of this application further provides a computer program product including instructions. When the computer program product is run on a computer, the computer is enabled to perform the method provided in any one of the first aspect or the implementations of the first aspect.

These or other aspects of this application are more concise and easier to understand in the description of the following embodiments.

BRIEF DESCRIPTION OF DRAWINGS

The following briefly describes the accompanying drawings required for describing embodiments.

DESCRIPTION OF EMBODIMENTS

The following further describes in detail this application with reference to accompanying drawings. A specific operation method in a method embodiment may also be applied to an apparatus embodiment or a system embodiment. It should be noted that, in the description of this application, "at least one" means "one or more". "A plurality of" means two or more. In view of this, in embodiments of this application, "a plurality of" may also be understood as "at least two". In addition, it should be understood that, in the description of this application, terms such as "first" and "second" are used only for purposes of distinguishing descriptions, but cannot be understood as indicating or implying relative importance, or as indicating or implying a sequence.

Figure 1:
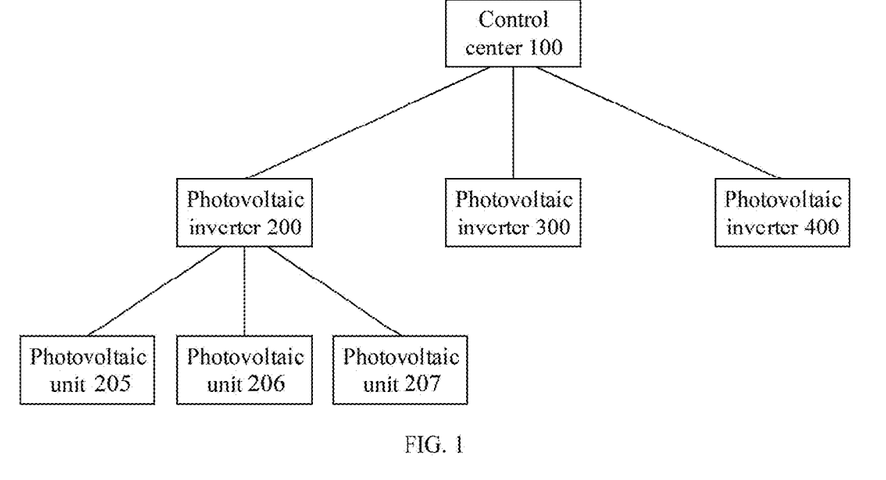
FIG. 1 is a schematic architectural diagram of a photovoltaic system to which at least one embodiment of this application is applicable.

FIG. 1 is a schematic architectural diagram of a photovoltaic system to which at least one embodiment of this application is applicable. As shown in FIG. 1, the photovoltaic system includes a control center 100, at least one photovoltaic inverter (such as photovoltaic inverters 200, 300, and 400 shown in FIG. 1), and at least one photovoltaic unit (such as photovoltaic units 205 to 207 in FIG. 1).

Figure 2:
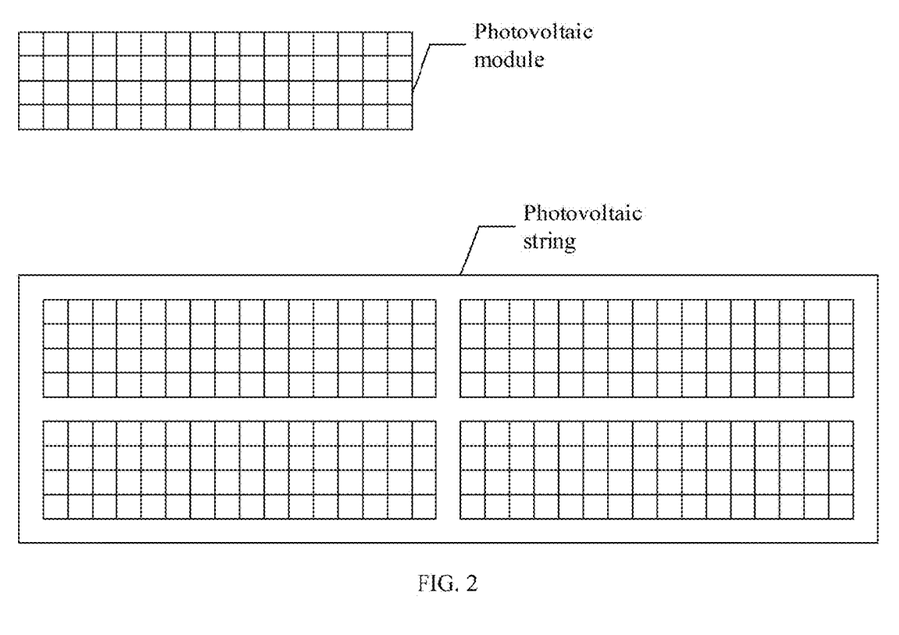
FIG. 2 is a schematic diagram of a photovoltaic string and a photovoltaic module.

The photovoltaic unit, also referred to herein as "photovoltaic device" or "photovoltaic structure," can absorb irradiation energy and convert the irradiation energy into electric energy in a form of a direct current. In this at least one embodiment of this application, the photovoltaic unit may be a photovoltaic module, or may be a photovoltaic string set including at least one photovoltaic string. Specifically, as shown in FIG. 2, one small square represents one solar cell, and the photovoltaic module may be a combination of solar cells obtained by connecting a plurality of solar cells in series and/or in parallel. As shown in FIG. 2, the photovoltaic string may be obtained by connecting a plurality of photovoltaic modules in series and/or in parallel. Generally, the photovoltaic string may also be referred to as a photovoltaic panel, and a photovoltaic power station usually includes a plurality of photovoltaic strings.

The photovoltaic inverter is configured to convert electric energy that is in the form of a direct current and that is generated by the photovoltaic unit into electric energy in a form of an alternating current, so that the electric energy generated by the photovoltaic unit may be incorporated into a three-phase power grid. In some embodiments, the photovoltaic inverter comprises a circuit configured to convert electric energy that is in the form of a direct current and that is generated by the photovoltaic units into electric energy in a form of an alternating current. In addition, there is a wired or wireless communication connection between the photovoltaic inverter and the control center 100. The photovoltaic inverter may further monitor a working parameter value of the photovoltaic unit, and report the working parameter value to the control center 100.

Specifically, the photovoltaic inverter may be a photovoltaic string inverter, or may be a centralized photovoltaic inverter. That the photovoltaic inverter 200 is a photovoltaic string inverter is used as an example. The photovoltaic inverter 200 has three direct current ports, and the three direct current ports are respectively connected to the photovoltaic unit 205, the photovoltaic unit 206, and the photovoltaic unit 207. The photovoltaic inverter 200 may separately monitor working parameter values of the photovoltaic unit 205, the photovoltaic unit 206, and the photovoltaic unit 207. For example, the photovoltaic inverter 200 may separately monitor at least one of maximum power point tracking (maximum power point tracking, MPPT) current values, MPPT voltage values, and MPPT power values of the three photovoltaic units. For another example, the photovoltaic inverter 200 may alternatively separately monitor at least one of working current values, working voltage values, and working power values of the three photovoltaic units.

The control center 100 may receive a working parameter value that is of each photovoltaic unit and that is provided by the photovoltaic inverter, and determine a working status of the photovoltaic unit based on the working parameter value, for example, may determine a power generation capacity and generating power of each photovoltaic unit based on the working parameter value.

Currently, operation and maintenance of the photovoltaic system mainly includes detection of each photovoltaic unit. In the art, there is a plurality of detection technologies that can implement the detection of the photovoltaic unit, such as infrared detection, current voltage (IV) detection, electroluminescent (electroluminescent, EL) detection, and photoluminescent (photoluminescent, PL) detection. However, detection accuracy of most detection technologies is affected by an environmental factor of the photovoltaic unit. For example, irradiance, a temperature, or a wind speed may affect the detection accuracy.

In view of this, in some technical solutions, a dedicated environmental monitoring apparatus may be disposed near the photovoltaic power station, and the environmental monitoring apparatus may monitor a current environmental status of the photovoltaic power station, and report an environmental parameter value obtained through monitoring to the control center. The control center may determine the current environmental status of the photovoltaic power station based on the environmental parameter value reported by the environmental monitoring apparatus. When the current environmental status of the photovoltaic power station meets a detection condition, the control center triggers detection of the photovoltaic power station.

However, deployment of the environmental monitoring apparatus increases operation and maintenance costs of the photovoltaic power station. In view of this, at least one embodiment of this application provides a detection condition determining method. The control center 100 may determine, based on working parameter values provided by the photovoltaic inverters (200, 300, 400), whether a target photovoltaic unit can be detected, so that there is no need to deploy an environmental monitoring apparatus independently. This helps reduce the operation and maintenance costs of the photovoltaic power station.

Figure 3:
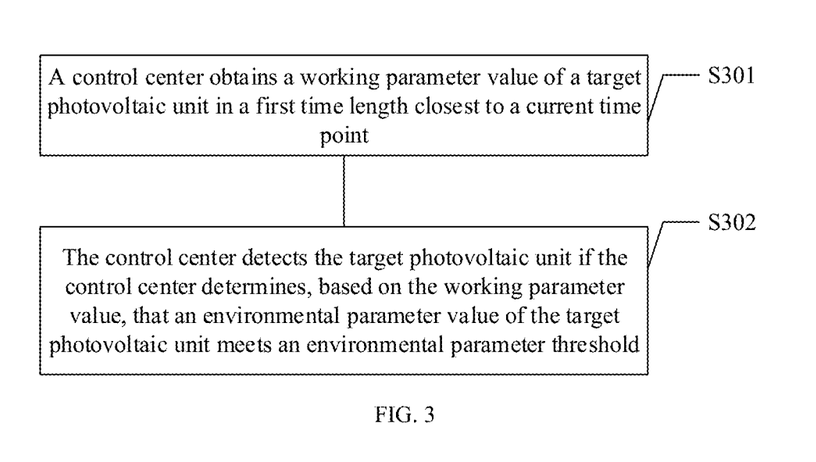
FIG. 3 is a schematic flowchart of a detection condition determining method according to at least one embodiment of this application.

For example, FIG. 3 is a schematic flowchart of a detection condition determining method according to at least one embodiment of this application. As shown in FIG. 3, the method mainly includes the following steps:

S301: A control center obtains a working parameter value of a target photovoltaic unit in a first time length closest to a current time point. In this at least one embodiment of this application, the target photovoltaic unit may be a photovoltaic module, or may be a photovoltaic string set including at least one photovoltaic string. Based on different actual types of target photovoltaic units, detection conditions of the photovoltaic units may be determined in different dimensions. The working parameter value of the target photovoltaic unit may be provided for the control center by a photovoltaic inverter coupled to the target photovoltaic unit. In a further scenario in which a photovoltaic module with an optimizer is installed, the photovoltaic module with an optimizer is connected to a battery or a small string, and may also provide a working parameter value of the battery or the small string for the control center. In this case, the target photovoltaic unit may alternatively be a battery or a small string of a lower dimension, and the working parameter value of the target photovoltaic unit may alternatively be provided for the control center by the photovoltaic module with an optimizer.

In a possible implementation, the photovoltaic inverter may periodically provide, for the control center, working parameter values respectively corresponding to a plurality of photovoltaic units and identification information of the plurality of photovoltaic units. The photovoltaic inverter may determine identification information of the target photovoltaic unit from the identification information respectively corresponding to the plurality of photovoltaic units, and further obtain the working parameter value of the target photovoltaic unit corresponding to the identification information of the target photovoltaic unit.

In this at least one embodiment of this application, the target photovoltaic unit may be any photovoltaic unit in a photovoltaic system. That is, the control center may separately use, based on a specific scanning rule, each photovoltaic unit in the photovoltaic system as the target photovoltaic unit, and perform the method shown in FIG. 3.

S302: The control center detects the target photovoltaic unit if the control center determines, based on the working parameter value, that an environmental parameter value of the target photovoltaic unit meets an environmental parameter threshold.

If the environmental parameter value of the target photovoltaic unit meets the environmental parameter threshold, it indicates that an environment in which the target photovoltaic unit is currently located is suitable for detection. Therefore, the control center may detect the target photovoltaic unit. IV detection is used as an example. The control center may send an instruction to the photovoltaic inverter, to instruct the photovoltaic inverter to detect the target photovoltaic unit. After receiving the instruction sent by the control center, the photovoltaic inverter detects a working current and a working voltage of the target photovoltaic unit, and reports a detected working current value and a detected working voltage value to the control center. The control center may further determine, based on the working current value and the working voltage value that are reported by the photovoltaic inverter, whether the target photovoltaic unit works normally. In addition, the control center may alternatively detect the target photovoltaic unit directly based on the working parameter value of the target photovoltaic unit in the first time length. This is not limited in this at least one embodiment of this application.

It may be understood that a working parameter value of a photovoltaic unit varies with an environmental parameter value of the photovoltaic unit. Therefore, whether the environmental parameter value of the target photovoltaic unit meets the environmental parameter threshold may be determined based on the working parameter value of the target photovoltaic unit. The IV detection is used as an example. The working current of the target photovoltaic unit increases with an increase of irradiance. If the irradiance is very high, an actual working current and an actual working voltage of the target photovoltaic unit exceed a monitoring range of the photovoltaic inverter. That is, if the working current value and the working voltage value of the target photovoltaic unit that are reported by the photovoltaic inverter are very high, it indicates that the working current value and the working voltage value have a risk of being invalid. In this case, detection of the target photovoltaic unit is not suitable.

Specifically, the control center may determine, in at least the following two implementations, whether the environmental parameter value of the target photovoltaic unit meets the environmental parameter threshold.

In a possible implementation, an environmental parameter threshold is preset in the control center. In this case, the control center may obtain a corresponding environmental parameter value through calculation based on a working parameter value, and the control center detects the target photovoltaic unit if the control center determines that the environmental parameter value meets the environmental parameter threshold.

For example, it is assumed that the working parameter value is a working current value of the target photovoltaic unit, and the environmental parameter value is an irradiance value of the target photovoltaic unit. The control center may obtain, through calculation based on the following formula 1, the environmental parameter value corresponding to the working parameter value:

$$G_{irr} = \frac{I_{test}}{\beta * I_{STC}} * 1000 \qquad \text{(Formula 1)}$$

$G_{irr}$ is an irradiance value obtained through calculation, $I_{test}$ is a working current value of the target photovoltaic unit in the first time length, $\beta$ is a preset coefficient, and $I_{STC}$ is a short-circuit current value of a component nameplate of the target photovoltaic unit. In some embodiments, the short-circuit current value of a component nameplate of the target photovoltaic unit is referred to as the nominal short-circuit current value of the target photovoltaic unit.

In another possible implementation, a working parameter threshold is preset in the control center, and the working parameter threshold is a working parameter value of the target photovoltaic unit determined when an environmental parameter value of an environment in which the target photovoltaic unit is located is the environmental parameter threshold. For example, in a configuration phase, the working parameter threshold may be obtained through calculation based on a predetermined environmental parameter threshold and formula 1. Specifically, a value of $G_{irr}$ is an environmental parameter threshold (irradiance threshold), and $I_{test}$ obtained through calculation is a working parameter threshold (working current threshold). Further, the working parameter threshold obtained through calculation is configured in the control center. For another example, when the environmental parameter value of the environment in which the target photovoltaic unit is located is the environmental parameter threshold, a current working parameter value of the target photovoltaic unit may be monitored, and the working parameter value obtained through monitoring may be configured in the control center as the working parameter threshold.

It should be noted that, that the environmental parameter value meets the environmental parameter threshold may mean that the environmental parameter value is less than the environmental parameter threshold, or may mean that the environmental parameter value is greater than the environmental parameter threshold, or may mean that the environmental parameter value is greater than a first environmental parameter threshold and less than a second environmental parameter threshold.

That the environmental parameter value is an irradiance value is used as an example. The environmental parameter threshold may be either a minimum irradiance value or a maximum irradiance value. That the environmental parameter value meets the environmental parameter threshold may mean that the irradiance value is greater than the minimum irradiance value, or may mean that the irradiance value is less than the maximum irradiance value, or may mean that the irradiance value is greater than the minimum irradiance value and less than the maximum irradiance value. A specific implementation of flexibly setting the environmental parameter threshold may make the technical solution provided in this at least one embodiment of this application applicable to different application scenarios.

For example, for a scenario with relatively low irradiance, such as a cloudy day or an evening, an irradiance value is less than the minimum irradiance value, and therefore does not meet the environmental parameter threshold. For another example, for a scenario with relatively high irradiance, an irradiance value is greater than the maximum irradiance value, and therefore does not meet the environmental parameter threshold either. In a scenario in which irradiance is suitable for detection, an irradiance value is greater than the minimum irradiance value and less than the maximum irradiance value, and the control center determines to detect the target photovoltaic unit.

The photovoltaic inverter is a common device in a photovoltaic power station, and may report a working parameter value of a photovoltaic unit to the control center, so that the control center may determine a working status of the photovoltaic unit based on the working parameter value, for example, may determine a power generation capacity and generating power of the photovoltaic unit. By using the method shown in FIG. 3, whether the target photovoltaic unit may be detected is determined by using the working parameter value provided by the photovoltaic inverter, there is no need to dispose a dedicated environmental monitoring apparatus near the photovoltaic power station, and there is no need to change an existing device in the photovoltaic power station. Therefore, this helps reduce operation and maintenance costs of the photovoltaic power station.

Figure 4A:
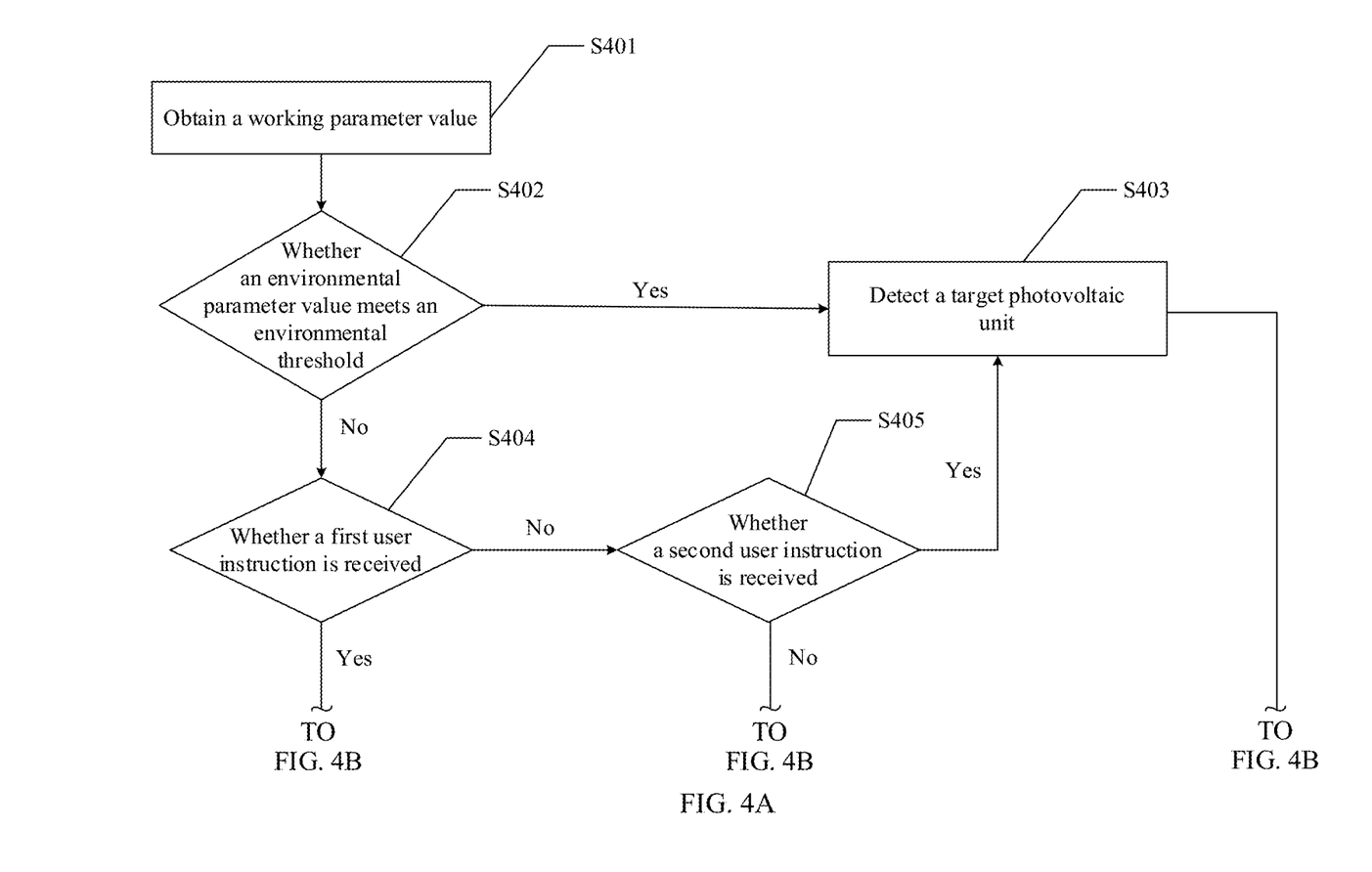
FIG. 4A and FIG. 4B are a schematic flowchart of an automatic detection method according to at least one embodiment of this application.
Figure 4B:
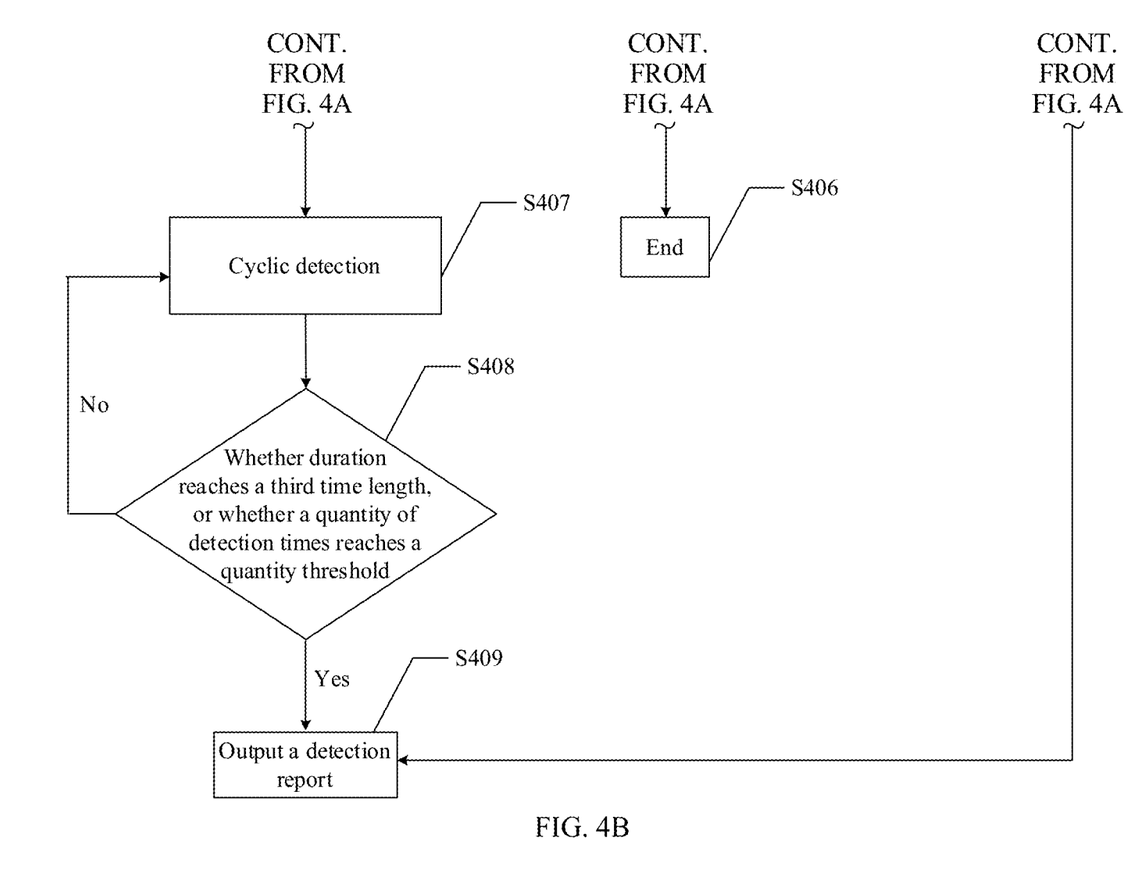

Currently, detection of a photovoltaic power station usually needs to be manually triggered. When one time of detection fails, operation and maintenance personnel usually need to manually trigger next detection again. This triggering manner causes a waste of human resources. In view of this, at least one embodiment of this application further provides a method for implementing automatic detection through cyclic detection. The method may have great application value in a large-scale distributed power station. For example, FIG. 4A and FIG. 4B are a schematic flowchart of an automatic detection method according to at least one embodiment of this application. As shown in FIG. 4A and FIG. 4B, the method mainly includes the following steps:

S401: Obtain a working parameter value of a target photovoltaic unit in a first time length closest to a current time point.

S402: Determine, based on the working parameter value, whether an environmental parameter value meets an environmental parameter threshold. For specific implementation, refer to the foregoing embodiment(s), and details are not described.

If the environmental parameter value meets the environmental parameter threshold, S403 is performed to detect the target photovoltaic unit. In a possible implementation, after S403 is performed, S409 may be further performed to output a detection report of the target photovoltaic unit based on a detection result.

If the environmental parameter value does not meet the environmental parameter threshold, S404 may be performed to determine whether a first user instruction is received. If a first user instruction is received, the first user instruction triggers performing of S407 to perform cyclic detection. It may be understood that if a control center determines that the environmental parameter value does not meet the environmental parameter threshold, the cyclic detection may alternatively be directly or automatically started without being triggered by the first user instruction.

In a possible implementation, in S404, if the first user instruction is not received, S405 may be further performed to determine whether a second user instruction is received. If a second user instruction is received, the second user instruction may trigger the control center to perform S403 to detect the target photovoltaic unit. That is, even if a current environment is not suitable for detecting the target photovoltaic unit, a user may use the second user instruction to force the control center to detect the target photovoltaic unit. It may be understood that if the control center receives neither the first user instruction nor the second user instruction, S406 may be performed to end the detection.

Figure 4C:
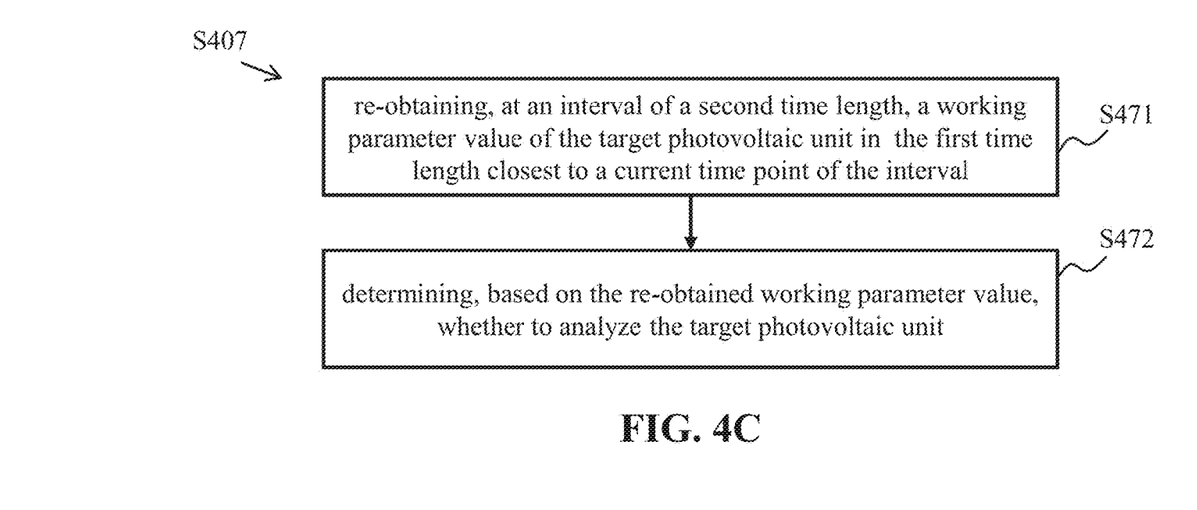
FIG. 4C is a schematic flow chart and FIG. 4D is a schematic time chart of a cyclic detection according to at least one embodiment of this application.
Figure 4D:
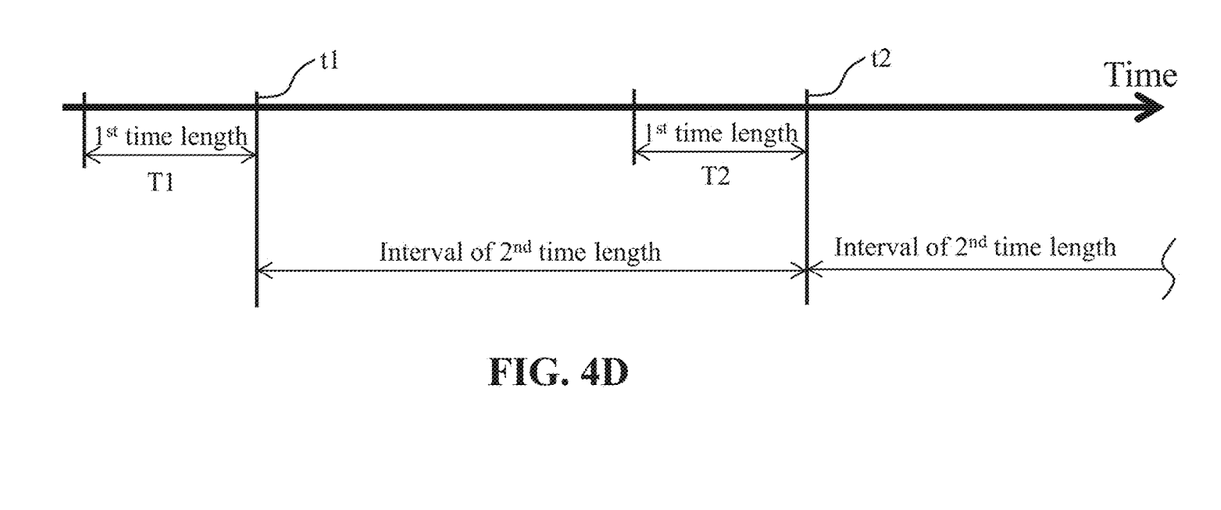

As shown in FIG. 4A and FIG. 4B, the control center performs cyclic detection in S407. FIG. 4C is a schematic flow chart and FIG. 4D is a schematic time chart of the cyclic detection in S407. Specifically, as shown in FIG. 4C, the cyclic detection (S407) comprises obtaining again (S471), at an interval of a second time length, a working parameter value of the target photovoltaic unit in the first time length closest to a corresponding detection time of the interval, and determining (S472), based on the working parameter value obtained again, whether to detect (or analyze) the target photovoltaic unit.

For example, as illustrated in FIG. 4D, it is assumed that the second time length is 24 hours, the first time length is 5 hours, and after the control center starts the cyclic detection, a first detection is performed for a first detection time (t1) of 10:00 on March 20. An obtained working parameter value is a working parameter value of the target photovoltaic unit in a period (T1) from 05:00 on March 20 to 10:00 on March 20, A second detection is performed for a second detection time (t2) of 10:00 on March 21, and an obtained working parameter value is a working parameter value of the target photovoltaic unit in a period (T2) from 05:00 on March 21 to 10:00 on March 21, The rest can be deduced from this, and details are not described.

As shown in FIG. 4A and FIG. 4B, after starting the cyclic detection, the control center may further monitor duration of the cyclic detection. As shown in S408, if the duration reaches a preset third time length, or the number of detections for detecting the target photovoltaic unit after the cyclic detection is started reaches a preset quantity threshold (Yes from S408), S409 is performed to output a detection report. Otherwise (No from S408), the cyclic detection is continued.

Specifically, the third time length and the quantity threshold may be preconfigured in the control center. Certainly, the first user instruction may alternatively indicate the third time length and the quantity threshold to the control center. This is not limited.

For example, the third time length is one month, and the quantity threshold is 10. That is, after the cyclic detection is started, and after the cyclic detection lasts for one month, or after the number of detections for detecting the target photovoltaic unit reaches 10, the cyclic detection may be stopped, and a detection report may be output. For example, the detection report may include content such as a detection time, a detection result, and a working parameter value used for detection, so that operation and maintenance personnel perform further analysis based on the detection report.

The foregoing mainly describes the solutions provided in the embodiments of this application from a perspective of the method embodiments. It may be understood that, to implement the foregoing functions, the control center may include a corresponding hardware structure and/or software module for performing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person ordinarily skilled in the art may use different methods to implement the described functions for each particular application, but it should not be considered that the implementation goes beyond the scope of the present application.

Figure 5:
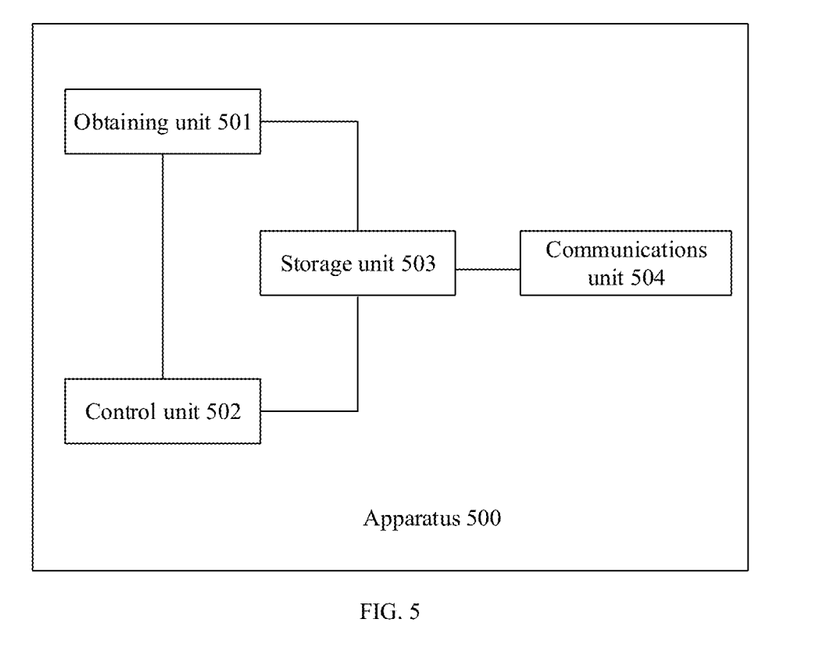
FIG. 5 is a schematic structural diagram of an apparatus according to at least one embodiment of this application.

When an integrated unit is used, FIG. 5 shows a possible example block diagram of an apparatus 500 in at least one embodiment of this application. The apparatus 500 may exist in a form of software executed, or run, on computer hardware. The apparatus 500 may include an obtaining unit 501 and a control unit 502. In addition, the apparatus 500 may further include a storage unit 503, configured to store program code and data of the apparatus 500.

The obtaining unit 501 and the control unit 502 may be a processor or a controller, for example, may be a general-purpose central processing unit (central processing unit, CPU), a general-purpose processor, a digital signal processor (digital signal processor, DSP), or an application-specific integrated circuit (application-specific integrated circuit, ASIC), a field programmable gate array (field programmable gate array, FPGA) or another programmable logic device, a transistor logic device, a hardware component, or any combination thereof. The controller/processor may implement or execute various example logical blocks, modules, and circuits described with reference to content disclosed in the present application. The processor may be a combination of processors implementing a computing function, for example, a combination of one or more microprocessors, or a combination of the DSP and a microprocessor. The storage unit 503 may be a memory.

The apparatus 500 may be the control center in any one of the foregoing embodiments, or may be a semiconductor chip disposed in the control center.

The apparatus 500 performs the actions of the control center in the foregoing method embodiments. Specifically, in at least one embodiment:

The obtaining unit 501 may obtain a working parameter value of a target photovoltaic unit in a first time length closest to a current time point. In this at least one embodiment of this application, a photovoltaic inverter coupled to the target photovoltaic unit may provide the working parameter value of the target photovoltaic unit for the apparatus. The control unit 502 detects the target photovoltaic unit if the control unit 502 determines, based on the working parameter value, that an environmental parameter value of the target photovoltaic unit meets an environmental parameter threshold.

In a possible implementation, the apparatus 500 may further include a communications unit 504. The communications unit 504 may be a communications interface, a transceiver, a transceiver circuit, or the like. The communications interface is a collective name. In specific implementation, the communications interface may include a plurality of interfaces. The communications unit 504 is configured to receive a working parameter value of each photovoltaic unit sent by the photovoltaic inverter, and store the received working parameter value in the storage unit 503. Further, the obtaining unit 501 may obtain, from the storage unit 503, the working parameter value of the target photovoltaic unit in the first time length closest to the current time point.

In a possible implementation, an environmental parameter threshold is preset in the control unit 502. The control unit 502 may specifically obtain, through calculation based on a working parameter value, an environmental parameter value corresponding to the working parameter value; and detect the target photovoltaic unit if the control unit 502 determines that the environmental parameter value meets the environmental parameter threshold. For example, the working parameter value is a working current value of the target photovoltaic unit, and the environmental parameter value is an irradiance value of the target photovoltaic unit. In this case, the working parameter value and the environmental parameter value meet the following formula:

$$G_{irr} = \frac{I_{test}}{\beta * I_{STC}} * 1000$$

$G_{irr}$ is the irradiance value, $I_{test}$ is the working current value, $\beta$ is a preset coefficient, and $I_{STC}$ is a short-circuit current value of a component nameplate of the target photovoltaic unit.

In another possible implementation, a working parameter threshold is preset in the control unit 502. The working parameter threshold may be a working parameter value of the target photovoltaic unit determined when an environmental parameter value of an environment in which the target photovoltaic unit is located is the environmental parameter threshold. In this case, if the control unit 502 determines that the working parameter value meets the preset working parameter threshold, the control unit 502 may detect the target photovoltaic unit.

In a possible implementation, the control unit 502 may be further configured to start cyclic detection if the control unit 502 determines, based on the working parameter value, that the environmental parameter value of the target photovoltaic unit does not meet a corresponding environmental parameter threshold. The cyclic detection includes: obtaining again, at an interval of a second time length, a working parameter value of the target photovoltaic unit in a first time length closest to a current time point, and determining, based on the working parameter value, whether to detect the target photovoltaic unit.

For example, whether to start cyclic detection may be triggered by a user instruction. In this case, if the control unit 502 receives a first user instruction used to instruct the apparatus to start the cyclic detection, the control unit 502 starts the cyclic detection. If the control unit 502 receives a second user instruction that instructs to perform detection, the control unit 502 may detect the target photovoltaic unit even if the environmental parameter value does not meet the corresponding environmental parameter threshold.

In a possible implementation, the control unit 502 may further monitor duration of the cyclic detection; obtain a detection result of each time of detection after the duration reaches a preset third time length, or after a quantity of detection times for detecting the target photovoltaic unit after the cyclic detection is started reaches a preset quantity threshold; and output a detection report based on the quantity of detection times and the detection result of each time of detection.

For example, in this at least one embodiment of this application, the target photovoltaic unit may be a photovoltaic module or a photovoltaic string set, and the photovoltaic string set is a set of at least one photovoltaic string. The working parameter value in this at least one embodiment of this application may be at least one of a working current value, a working voltage value, a working power value, a maximum power point tracking (MPPT) current value, an MPPT voltage value, and an MPPT power value of the target photovoltaic unit. The environmental parameter value in this at least one embodiment of this application may be at least one of a temperature value, an irradiance value, and a wind speed value of the environment in which the target photovoltaic unit is located. This is not limited herein in this at least one embodiment of this application.

Figure 6:
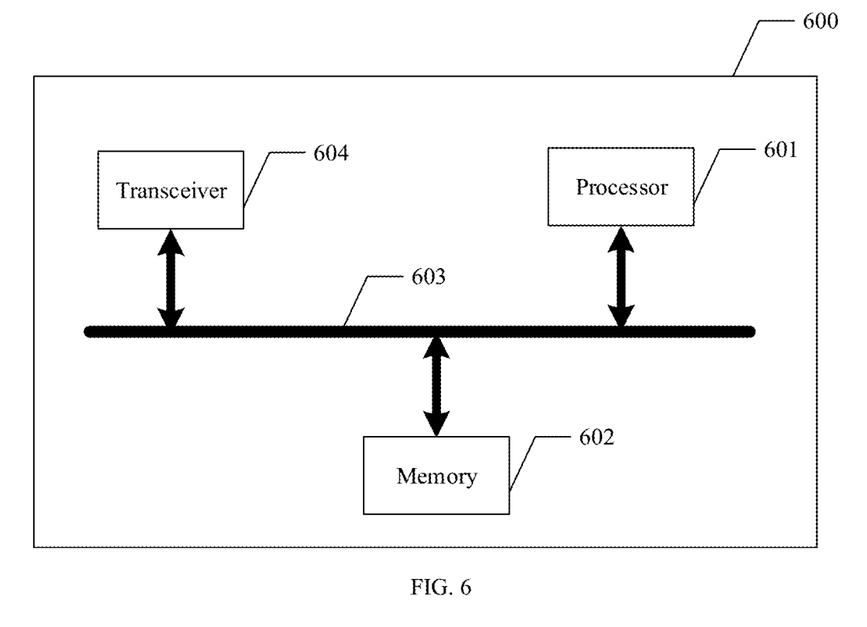
FIG. 6 is a schematic structural diagram of an apparatus according to at least one embodiment of this application.

FIG. 6 is a schematic diagram of an apparatus 600 according to this application. The apparatus may be the control center in at least one foregoing embodiment. The apparatus 600 includes a processor 601 and a memory 602. Optionally, the apparatus 600 may further include a bus 603. The processor 601 and the memory 602 may be connected to each other by using the bus 603. The bus 603 may be a peripheral component interconnect (peripheral component interconnect, PCI for short) bus, an extended industry standard architecture (extended industry standard architecture, EISA for short) bus, or the like. The bus 603 may be classified into an address bus, a data bus, a control bus, and the like. For ease of representation, only one thick line is used to represent the bus in FIG. 6, but this does not mean that there is only one bus or only one type of bus.

The processor 601 may be a CPU, a microprocessor, an ASIC, or one or more integrated circuits configured to control program execution in the solutions of this application.

The memory 602 may be a read-only memory (read-only memory, ROM) or another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, and the like), a disk storage medium or another magnetic storage device, or any other non-transitory medium capable of carrying or storing desired program code in a form of an instruction or a data structure and capable of being accessed by a computer, but is not limited thereto. The memory 602 may exist independently, and is connected to the processor 601 by using the bus 603. Alternatively, the memory 602 may be integrated with the processor 601.

The memory 602 is configured to store computer program instructions for executing the solutions of this application, and the processor 601 controls the execution. The processor 601 is configured to execute the computer program instructions stored in the memory 602, to perform the detection condition determining method provided in at least one foregoing embodiment of this application.

In a possible implementation, the apparatus 600 may further include a transceiver 604. The transceiver 604 may perform wired or wireless communication with a photovoltaic inverter, to receive a working parameter value of each photovoltaic unit reported by the photovoltaic inverter. The transceiver 604 may further store the received working parameter value in the memory 602. When executing the computer program instructions stored in the memory 602, the processor 601 may further obtain, from the memory 602, a working parameter value of a target photovoltaic unit in a first time length closest to a current time point.

Optionally, the computer program instructions in this at least one embodiment of this application may also be referred to as application code. This is not specifically limited in this at least one embodiment of this application.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons ordinarily skilled in the art can make changes and modifications to these embodiments once they learn the basic inventive concept. Therefore, the following claims are intended to be construed as to cover the preferred embodiments and all changes and modifications falling within the scope of this application.

The invention claimed is:

1. An analysis condition determining method, comprising:
obtaining, by a control center, a working parameter value of a target photovoltaic unit in a first time length closest to a current time point, wherein the working parameter value of the target photovoltaic unit is provided for the control center by a photovoltaic inverter coupled to the target photovoltaic unit;
analyzing, by the control center, the target photovoltaic unit in response to the control center determining, based on the working parameter value, that an environmental parameter value of an environment in which the target photovoltaic unit is located meets an environmental parameter threshold; and starting, by the control center, cyclic analysis in response to the control center determining, based on the working parameter value, that the environmental parameter value does not meet the environmental parameter threshold, wherein the cyclic analysis comprises:

re-obtaining, at an interval of a second time length, a working parameter value of the target photovoltaic unit in the first time length closest to a current time point of the interval, and determining, based on the re-obtained working parameter value, whether to analyze the target photovoltaic unit.

2. The method according to claim 1, further comprising:
obtaining, by the control center, the environmental parameter value based on the working parameter value.

3. The method according to claim 1, wherein
the control center determines that the environmental parameter value meets the environmental parameter threshold in response to determining that the working parameter value meets a preset working parameter threshold, wherein the working parameter threshold is a working parameter value of the target photovoltaic unit when the environmental parameter value is the environmental parameter threshold.

4. The method according to claim 1, wherein the method further comprises:
monitoring duration of the cyclic analysis; and
outputting an analysis report in response to the duration reaching a preset third time length.

5. The method according to claim 1, wherein the target photovoltaic unit is a photovoltaic module or a photovoltaic string set, and the photovoltaic string set comprises at least one photovoltaic string.

6. A computing device, comprising a processor, a memory, and program instructions that are stored in the memory, wherein when the program instructions are executed by the processor, the computing device is enabled to perform the method according to claim 1.

7. A non-transitory computer-readable storage medium, storing program instructions, wherein when the program instructions are run on a computer, the computer is enabled to perform the method according to claim 1.

8. A photovoltaic system, comprising a target photovoltaic unit, a control center, and a photovoltaic inverter, wherein
the target photovoltaic unit is configured to absorb irradiation energy and convert the irradiation energy into electric energy;
the photovoltaic inverter is configured to be coupled to the target photovoltaic unit, detect a working parameter value of the target photovoltaic unit, and provide the working parameter value of the target photovoltaic unit for the control center; and
the control center is configured to perform, based on the working parameter value provided by the photovoltaic inverter, the method according to claim 1.

9. The method according to claim 2, wherein the working parameter value is a working electric current value of the target photovoltaic unit, and the environmental parameter value is an irradiance intensity value of the target photovoltaic unit; and
the working parameter value and the environmental parameter value meet the following formula:

$$G_{irr} = \frac{I_{test}}{\beta * I_{STC}} * 1000,$$

wherein
$G_{irr}$ is the irradiance intensity value, $I_{test}$ is the working electric current value, $\beta$ is a preset coefficient, and $I_{STC}$ is a short-circuit current value of a component nameplate of the target photovoltaic unit.

10. An analysis condition determining apparatus, comprising:
an obtaining unit, configured to obtain a working parameter value of a target photovoltaic unit in a first time length closest to a current time point, wherein the working parameter value of the target photovoltaic unit is provided for the apparatus by a photovoltaic inverter coupled to the target photovoltaic unit; and
a control unit, configured to
analyze the target photovoltaic unit in response to the control unit determining, based on the working parameter value, that an environmental parameter value of an environment in which the target photovoltaic unit is located meets an environmental parameter threshold, and
start cyclic analysis in response to the control unit determining, based on the working parameter value, that the environmental parameter value does not meet the corresponding environmental parameter threshold, wherein the cyclic analysis comprises:
re-obtaining, at an interval of a second time length, a working parameter value of the target photovoltaic unit in the first time length closest to a current time point of the interval, and
determining, based on the re-obtained working parameter value, whether to analyze the target photovoltaic unit.

11. The apparatus according to claim 10, wherein the control unit is further configured to:
obtain the environmental parameter value based on the working parameter value.

12. The apparatus according to claim 10, wherein the control unit is configured to:
determine that the environmental parameter value meets the environmental parameter threshold in response to determining that the working parameter value meets a preset working parameter threshold, wherein the working parameter threshold is a working parameter value of the target photovoltaic unit when the environmental parameter value is the environmental parameter threshold.

13. The apparatus according to claim 10, wherein the control unit is further configured to:
monitor duration of the cyclic analysis; and
output an analysis report in response to the duration reaching a preset third time length.

14. The apparatus according to claim 10, wherein the target photovoltaic unit is a photovoltaic module or a photovoltaic string set, and the photovoltaic string set comprises at least one photovoltaic string.

15. The apparatus according to claim 11, wherein the working parameter value is a working electric current value of the target photovoltaic unit, and the environmental parameter value is an irradiance intensity value of the target photovoltaic unit; and
the working parameter value and the environmental parameter value meet the following formula:

$$G_{irr} = \frac{I_{test}}{\beta * I_{STC}} * 1000,$$

wherein $G_{irr}$ is the irradiance intensity value, $I_{test}$ is the working electric current value, β is a preset coefficient, and $I_{STC}$ is a short-circuit current value of a component nameplate of the target photovoltaic unit.

\* \* \* \* \*

UNITED STATES PATENT AND TRADEMARK OFFICE
CERTIFICATE OF CORRECTION

Page 1 of 1

PATENT NO. : 11,799,419 B2
APPLICATION NO. : 17/533614
DATED : October 24, 2023
INVENTOR(S) : Jianqiang Wang It is certified that error appears in the above-identified patent and that said Letters Patent is hereby corrected as shown below:

On the Title Page

Item (73) Assignee, Please change "HUAWEI TECHNOLOGIES CO., LTD." to --HUAWEI DIGITAL POWER TECHNOLOGIES CO., LTD.--.

Signed and Sealed this
Twenty-sixth Day of November, 2024

Katherine Kelly Vidal
*Director of the United States Patent and Trademark Office*